US009778656B2

(12) United States Patent
Waltz et al.

(10) Patent No.: US 9,778,656 B2
(45) Date of Patent: Oct. 3, 2017

(54) MULTIMODE VEHICULAR NAVIGATION CONTROL (71) Applicant: Crown Equipment Corporation, New Bremen, OH (US)

(72) Inventors: Lucas B. Waltz, Coldwater, OH (US); Bing Zheng, Sidney, OH (US); Thomas L. Mallak, Spencerville, OH (US); Steve Mangette, Lima, OH (US)

(73) Assignee: Crown Equipment Corporation, New Bremen, OH (US)

( * ) Notice: Subject to any disclaimer, the term of this patent is extended or adjusted under 35 U.S.C. 154(b) by 165 days.

(21) Appl. No.: 13/626,396

(22) Filed: Sep. 25, 2012

(65) Prior Publication Data

US 2013/0054052 A1 Feb. 28, 2013

Related U.S. Application Data (63) Continuation of application No. PCT/US2012/052809, filed on Aug. 29, 2012.

(Continued)

(51) Int. Cl.
*G05D 1/02* (2006.01)
*G01C 21/00* (2006.01)
(Continued)

(52) U.S. Cl.
CPC ........... *G05D 1/0088* (2013.01); *B66F 9/063* (2013.01); *G05D 1/0274* (2013.01); *G05D 2201/0216* (2013.01)

(58) Field of Classification Search
CPC .. G05D 1/00; B60L 11/00; G06F 9/00; G01C 21/00
(Continued)

(56) References Cited

U.S. PATENT DOCUMENTS 3,567,048 A 3/1971 Whitham
3,942,088 A 3/1976 Yosioka et al.
(Continued)

FOREIGN PATENT DOCUMENTS

CN 101939248 A 1/2011

OTHER PUBLICATIONS

Notice of Allowance for U.S. Appl. No. 13/626,400 dated Jan. 8, 2014.
(Continued)

*Primary Examiner* — Yonel Beaulieu
*Assistant Examiner* — Martin Weeks
(74) *Attorney, Agent, or Firm* — Dinsmore & Shohl LLP (57) ABSTRACT

Included are embodiments for multimode vehicular navigation control. Some embodiments include a vehicle that has a memory component and a vehicle control module (VCM), where the VCM includes a controller. Additionally, the memory component may store functional modes of operation and control modes of operation, each of the control modes of operation being associated with a mechanism for controlling the vehicle, and each of the functional modes of operation being associated with a desired function of the vehicle. In some embodiments the VCM receives control commands from a system operator and implements the control commands, utilizing the controller. In some embodiments, at least one of the control modes of operation is configured for automatic control of the vehicle and at least one of the control modes of operation is a torque control mode for providing a power signal directly to a vehicle motor, without utilization of the controller.

20 Claims, 4 Drawing Sheets

Related U.S. Application Data (60) Provisional application No. 61/528,499, filed on Aug. 29, 2011.

(51) Int. Cl.
    *G05D 1/00*     (2006.01)
    *B66F 9/06*     (2006.01)

(58) Field of Classification Search
    USPC .............................. 701/23, 41, 44; 180/65.22
    See application file for complete search history.

(56) References Cited

U.S. PATENT DOCUMENTS

| | | | |
|---|---|---|---|
| 4,040,500 A | 8/1977 | Blakeslee | |
| 4,077,486 A | 3/1978 | Blakeslee et al. | |
| 4,083,422 A | 4/1978 | Blakeslee et al. | |
| 4,279,487 A | 7/1981 | Baker et al. | |
| 4,319,820 A | 3/1982 | Ostrowski et al. | |
| 4,744,408 A | 5/1988 | Pearson et al. | |
| 5,068,790 A | 11/1991 | Wellman | |
| 5,184,122 A | 2/1993 | Decious et al. | |
| 5,213,548 A | 5/1993 | Colbert et al. | |
| 5,401,223 A | 3/1995 | White et al. | |
| 5,557,519 A | 9/1996 | Morita | |
| 5,625,558 A | 4/1997 | Togai et al. | |
| 5,726,890 A * | 3/1998 | Takamoto et al. | 701/70 |
| 5,778,327 A | 7/1998 | Simmons et al. | |
| 5,778,853 A * | 7/1998 | Saito | 123/396 |
| 5,795,264 A | 8/1998 | Steeby et al. | |
| 5,938,710 A | 8/1999 | Lanza et al. | |
| 5,938,711 A | 8/1999 | Steeby et al. | |
| 5,995,001 A | 11/1999 | Wellman et al. | |
| 5,995,884 A | 11/1999 | Allen et al. | |
| 6,050,359 A | 4/2000 | Mouri et al. | |
| 6,220,219 B1 * | 4/2001 | Wadas et al. | 123/352 |
| 6,317,637 B1 | 11/2001 | Limroth | |
| 6,414,594 B1 | 7/2002 | Guerlain | |
| 6,445,984 B1 | 9/2002 | Kellogg | |
| 6,553,302 B2 | 4/2003 | Goodnight et al. | |
| 6,591,172 B2 | 7/2003 | Oda et al. | |
| 6,643,578 B2 | 11/2003 | Levine | |
| 6,781,516 B2 | 8/2004 | Reynard et al. | |
| 6,789,008 B2 | 9/2004 | Kato et al. | |
| 6,813,557 B2 | 11/2004 | Schmidt et al. | |
| 6,853,877 B1 | 2/2005 | Slater et al. | |
| 6,931,958 B2 | 8/2005 | Takeda | |
| 6,995,688 B2 | 2/2006 | Reynolds | |
| 7,099,745 B2 | 8/2006 | Ebert | |
| 7,344,037 B1 | 3/2008 | Zakula, Sr. et al. | |
| 7,366,600 B2 | 4/2008 | Osaki et al. | |
| 7,444,193 B2 | 10/2008 | Cutler | |
| 7,634,332 B2 | 12/2009 | Williams et al. | |
| 7,739,006 B2 | 6/2010 | Gillula | |
| 7,865,277 B1 | 1/2011 | Larson et al. | |
| 7,932,827 B2 | 4/2011 | Chand et al. | |
| 8,060,400 B2 | 11/2011 | Wellman | |
| 8,179,286 B2 | 5/2012 | Faus et al. | |
| 8,239,251 B2 | 8/2012 | Wellman | |
| 8,239,252 B2 | 8/2012 | Wellman | |
| 8,249,910 B2 | 8/2012 | Wellman et al. | |
| 2003/0154319 A1 * | 8/2003 | Araki et al. | 709/310 |
| 2004/0193363 A1 | 9/2004 | Schmidt et al. | |
| 2005/0075784 A1 | 4/2005 | Gray et al. | |
| 2005/0131645 A1 | 6/2005 | Panopoulos | |
| 2005/0187752 A1 * | 8/2005 | Colby et al. | 703/19 |
| 2005/0246078 A1 | 11/2005 | Vercammen | |
| 2006/0064216 A1 | 3/2006 | Palmer | |
| 2006/0089765 A1 | 4/2006 | Pack et al. | |
| 2007/0158128 A1 | 7/2007 | Gratz et al. | |
| 2007/0293989 A1 | 12/2007 | Norris | |
| 2008/0114533 A1 | 5/2008 | Weiss et al. | |
| 2008/0245598 A1 | 10/2008 | Gratz et al. | |
| 2009/0222160 A1 | 9/2009 | Morselli et al. | |
| 2009/0271058 A1 | 10/2009 | Chilson | |
| 2009/0287406 A1 | 11/2009 | Ohi | |
| 2009/0288893 A1 * | 11/2009 | Wyall et al. | 180/65.22 |
| 2010/0084207 A1 * | 4/2010 | Wyall | 180/65.22 |
| 2010/0161136 A1 | 6/2010 | Takeshita et al. | |
| 2011/0071718 A1 | 3/2011 | Norris et al. | |
| 2011/0098890 A1 | 4/2011 | Lee et al. | |
| 2011/0251701 A1 | 10/2011 | Jung | |
| 2011/0281562 A1 * | 11/2011 | Videtich | 455/414.1 |
| 2012/0022761 A1 * | 1/2012 | Matsuda | 701/87 |
| 2012/0065820 A1 * | 3/2012 | Morris | 701/22 |
| 2012/0323432 A1 | 12/2012 | Wong et al. | |
| 2014/0209406 A1 | 7/2014 | Wetterer et al. | |

OTHER PUBLICATIONS

Search Report and Written Opinion as it relates to PCT/US2012/052820 mailed Jan. 22, 2013.
Final Office Action dated Sep. 23, 2013 for U.S. Appl. No. 13/626,400, filed Sep. 25, 2012.
Office Action dated May 22, 2013 for U.S. Appl. No. 13/626,385, filed Sep. 25, 2012.
Office Action dated Mar. 27, 2013 for U.S. Appl. No. 13/626,400, filed Sep. 25, 2012.
Patent Examination Report pertaining to Australian Patent Application No. 2012302054, dated Jun. 10, 2014.
Communication pursuant to Rules 161(1) and 162 EPC pertaining to European Patent Application No. 12770315.5 dated May 2, 2014.
Office Action dated Jul. 8, 2014 pertaining to U.S. Appl. No. 14/208,852.
Patent Examination Report No. 1 dated Jun. 20, 2014 pertaining to Australian Patent Application No. 2012302046.
International Search Report and Written Opinion pertaining to PCT/US2012/052837, dated Nov. 15, 2012.
Search Report and Written Opinion as it relates to PCT/US2012/052809 mailed Dec. 19, 2012.
Office Action dated Jun. 25, 2015 pertaining to Chinese Patent Application No. 201280042137.2.
Office Action dated Sep. 1, 2015 pertaining to Chinese Patent Application No. 201280042687.4.
Office Action dated Feb. 19, 2016 pertaining to Chinese Patent Application No. 201280042137.2.

* cited by examiner

MULTIMODE VEHICULAR NAVIGATION CONTROL

CROSS-REFERENCE TO RELATED APPLICATIONS

The present application is filed under 35 U.S.C. 111(a) as a continuation of International Patent Application No. PCT/US12/052809 (CRO 0490 WO), filed Aug. 29, 2012, which international application designates the United States and claims the benefit of U.S. Provisional Application Ser. No. 61/528,499 (CRO 0490 MA) filed Aug. 29, 2011.

BACKGROUND

Embodiments provided herein generally relate to multimode vehicular navigation control, and particularly to systems and methods for providing a plurality of functional modes and control modes to a vehicle to enhance vehicle performance.

Many warehouse environments utilize one or more forklifts and/or other vehicles for moving products into, out of, and within the warehouse. Accordingly, many current solutions utilize a vehicle operator to determine which products need to be moved and to where the products should be moved. While the vehicle operators may be capable of sufficiently navigating the vehicle to perform the desired tasks, the vehicle operators represent a significant cost to moving goods through a warehouse. As such, many current solutions provide semi-automated and/or fully automated operation of the vehicle. While such operation changes can provide different controls for the vehicle, oftentimes, automatic operation of the vehicle may still be difficult.

SUMMARY

Included are embodiments for multimode vehicular navigation control. Some embodiments include a vehicle that has a memory component and a vehicle control module (VCM), where the VCM includes a controller. Additionally, the memory component may store functional modes of operation and control modes of operation, each of the control modes of operation being associated with a mechanism for controlling the vehicle, and each of the functional modes of operation being associated with a desired function of the vehicle. In some embodiments the VCM receives control commands from a system operator and implements the control commands, utilizing the controller. In some embodiments, at least one of the control modes of operation is configured for automatic control of the vehicle and at least one of the control modes of operation is a torque control mode for providing a power signal directly to a vehicle motor, without utilization of the controller.

Also included are embodiments of a method for multimode vehicular navigation control. The method may include receiving an automatic command at a navigation control module (NCM), determining a functional mode command and a control mode command, and determining a type of functional mode associated with the functional mode command. Some embodiments include determining a type of control mode associated with the control mode command, sending a signal from the NCM to a vehicle control module (VCM) on the vehicle that identifies a control operation, and activating a motor of the vehicle, based on the type of functional mode and the type of control mode.

Also included are embodiments of a vehicle. In some embodiments, the vehicle includes a memory component and a vehicle control module (VCM), which includes a controller. In some embodiments, the memory component stores functional modes of operation and control modes of operation, where each of the control modes of operation is configured for controlling the vehicle, and each of the functional modes of operation defines a function of operation of the vehicle. In some embodiments, at least one of the control modes of operation is configured for automatic control of the vehicle and at least one of the control modes of operation is a torque control mode for providing a power signal directly to a vehicle motor, without utilization of the controller. In some embodiments, at least one of the control modes of operation utilizes the VCM and controller for controlling the vehicle.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
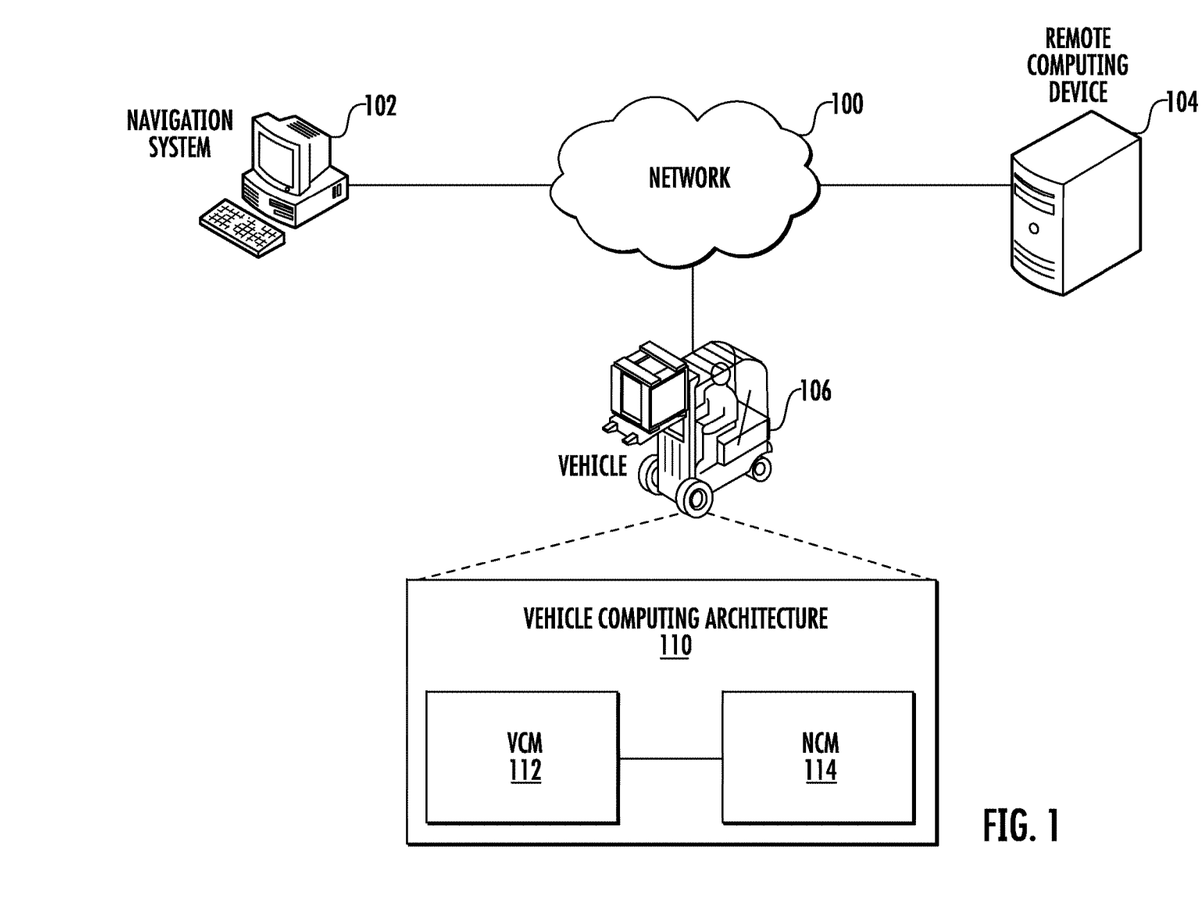
FIG. 1 depicts a computing environment for providing vehicular navigation control, according to one or more embodiments shown and described herein.

FIG. 1 depicts a computing environment for providing vehicular navigation control, according to one or more embodiments shown and described herein. As illustrated, a network 100 may facilitate communication among a navigation system 102, a remote computing device 104, and a vehicle 106. The network 100 may include a wired and/or wireless local area network, wide area network, and/or other type of network for communicating information. The navigation system 102 includes a computing device, which may be located at a warehouse or other environment. The navigation system 102 may be configured as a server or other computing device and may be configured for sending navigation data to the vehicle 106 and/or receiving navigation data from the vehicle 106. Additionally, the remote computing device 104, which may be configured as a management computing device, server, or other computing device, may be configured for processing work orders. The work orders may identify the location of a product that needs to be moved and/or provide other similar information. With the work order information, the navigation system 102 and/or the remote computing device 104 may be configured to determine a vehicle for performing the desired task. Additionally, the navigation system 102 may determine an order of priority that tasks are performed by a particular vehicle 106. The navigation system 102 may communicate with the vehicle 106 to determine the location of the vehicle 106. With the location of the vehicle 106, the navigation system 102 may more efficiently assign tasks to the vehicle 106.

Additionally, the communication between the navigation system 102 and the vehicle 106 may include sending the destinations and/or routing data to the vehicle 106. The routing data may include a plurality of path segments, which may include one or more lines and/or arcs for reaching a predetermined destination from the current location of the vehicle 106. In some embodiments, however, the vehicle 106 receives coordinates for the predetermined destination and determines its own routing to reach that destination.

Also included is the remote computing device 104. The remote computing device 104 may also be configured as a server or other computing device and may be configured to provide the navigation system 102 with the work orders and/or other information. In some embodiments, the remote computing device 104 may be located on the same premises as the navigation system 102, while in some embodiments the remote computing device 104 may be located remotely from the navigation system 102. Similarly, depending on the particular embodiment, the remote computing device 104 may be configured to service one or more different environments and communicate with one or more different navigation systems.

FIG. 1 also depicts the vehicle 106. The vehicle 106 may be configured as a warehouse vehicle, such as a forklift, truck, etc. Additionally, the vehicle 106 may include one or more vehicle control systems, such as a steering system, a braking system, an acceleration system, a traction system, etc. Also included is a user interface, location tracking sensors (such as laser sensors, light sensors, etc.), and vehicle computing architecture 110, which may include a vehicle control module (VCM) 112 and a navigation control module (NCM) 114. As discussed in more detail below, the VCM 112 may be configured to facilitate operator initiated control of the vehicle 106 through the use of a manual mode. The NCM 114 may be configured to facilitate system-initiated operation of the vehicle 106 through the use of an auto operation mode.

Figure 2:
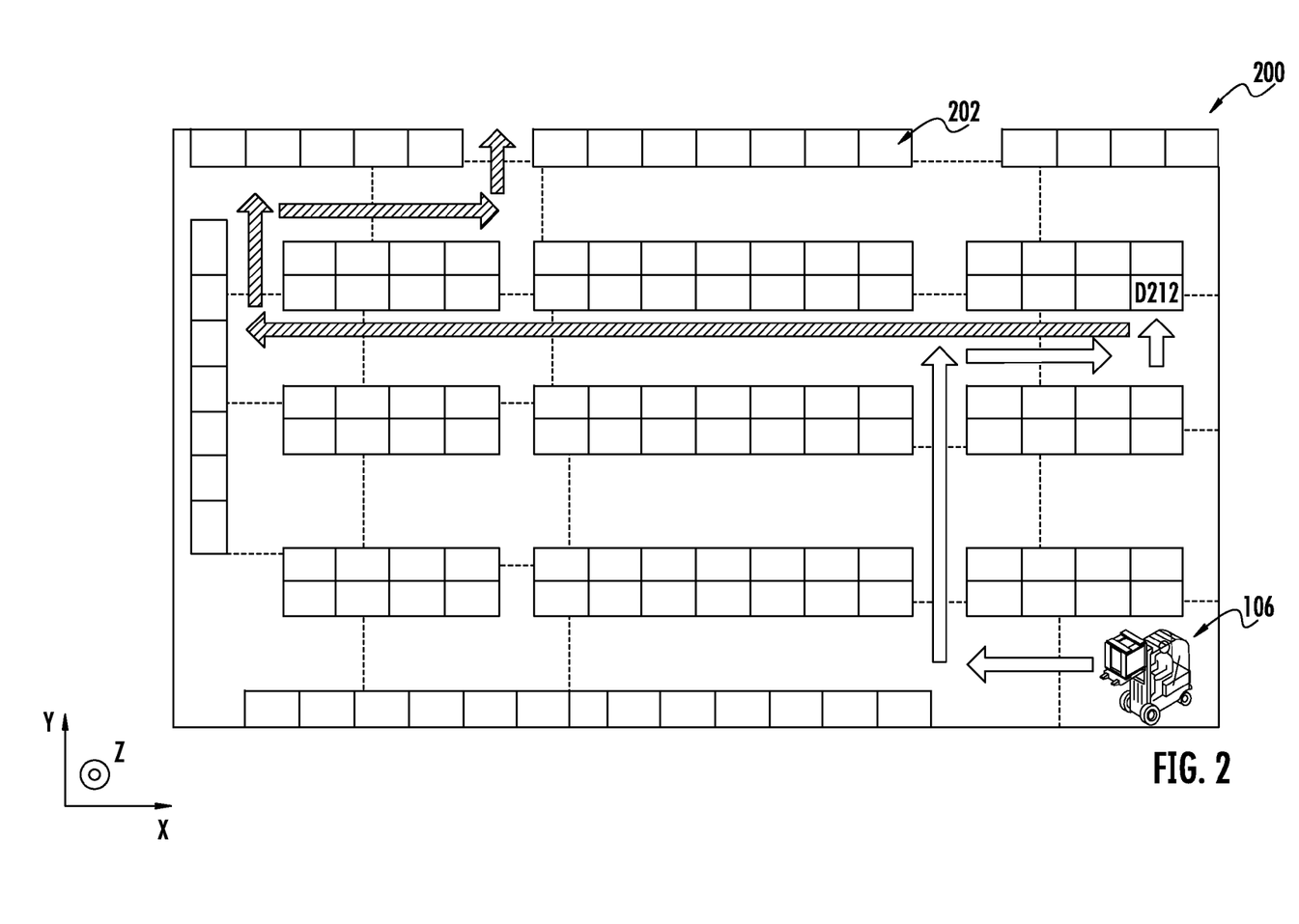
FIG. 2 depicts an environment map for providing vehicle navigation control, according to embodiments shown and disclosed herein.

FIG. 2 depicts an environment map 200 for providing vehicle navigation, according to embodiments shown and disclosed herein. As illustrated, the environment map 200 may simulate an environment, such as a warehouse and may include a plurality of products 202. The products may be organized in a predetermined arrangement and may be not only arranged along the floor (in the "x" and "y" directions), but may also be stacked vertically (in the "z" direction). As discussed briefly above, the vehicle 106 may be operated in manual mode by an operator sending a manual command to the vehicle 106. The operator may then implement a manual control function to manually navigate the vehicle 106 to the predetermined destination, perform the desired task, and then proceed to the next task.

If an automatic command has been sent to the vehicle 106, the vehicle 106 may operate in automatic mode and may receive automatic control commands to implement an automatic control function. Thus, the vehicle 106 may perform the desired tasks without the assistance of a human operator. As such, the vehicle 106 may receive one more locations (or a predetermined route) from the navigation system 102. With this information, the vehicle 106 may travel to a desired location, perform the desired task, and then proceed to the next location.

As an example, if the vehicle 106 is currently operating in automatic mode, the vehicle 106 may receive a task, a predetermined destination (such as address D212), and/or a route for reaching the address D212. Depending on the information received, the vehicle 106 may calculate a route to the predetermined destination and may then perform the task. In this particular example, the task requests the vehicle 106 to pick up the product located at the address D212. From the current location of the vehicle 106, the vehicle 106 may then use sensors and mapping data to navigate according to the determined path. In some embodiments, the vehicle 106 includes a light sensor. The light sensor may determine the relative position of the vehicle 106 with regard to the overhead lighting fixtures. Based on this information, and/or other information (such as laser sensor information, odometer readings, etc.), the vehicle 106 (and/or the navigation system 102) may ensure that the vehicle 106 is on the correct path.

Figure 3:
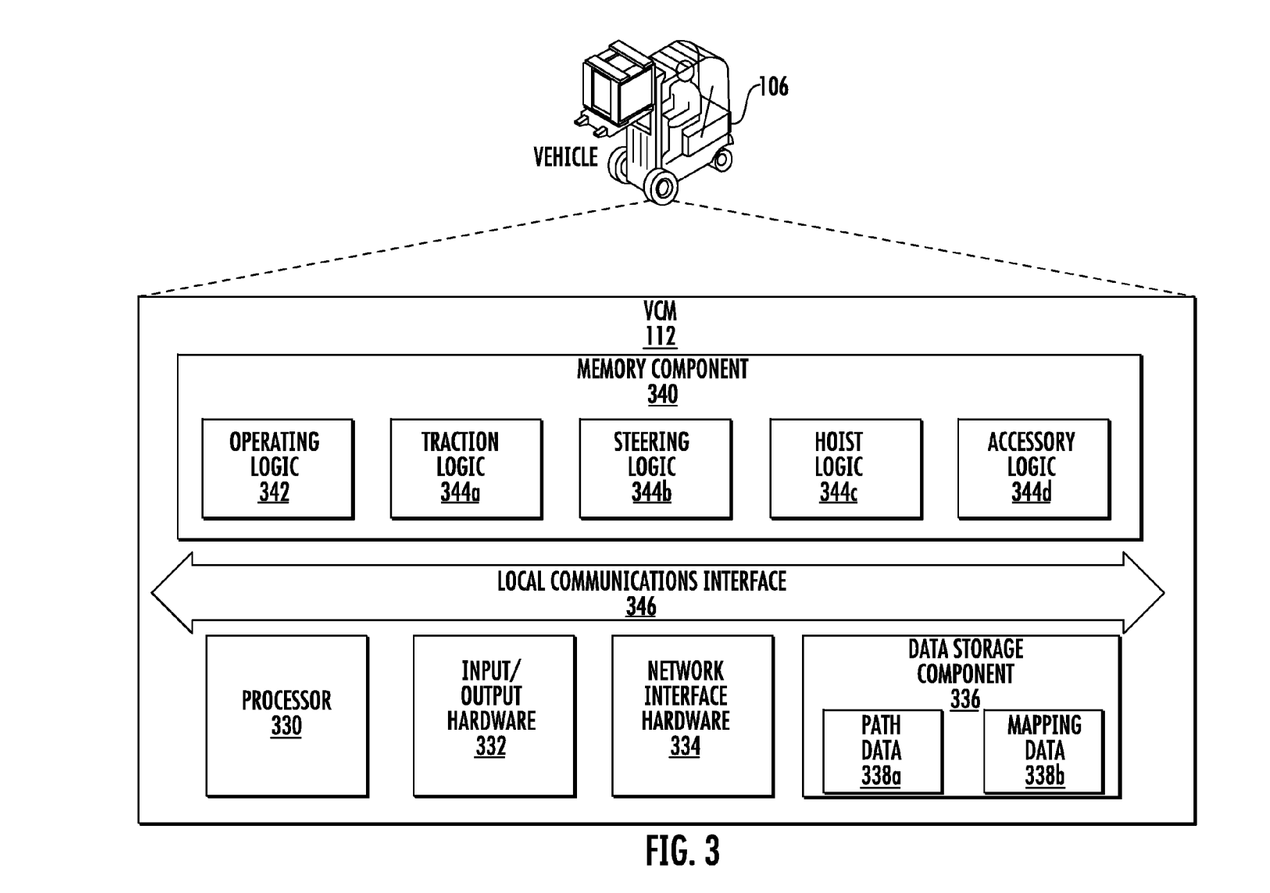
FIG. 3 depicts a computing environment for providing control logic in a vehicle control module, according to one or more embodiments shown and described herein.

FIG. 3 depicts a computing environment for providing control logic in the VCM 112, according to one or more embodiments shown and described herein. In the illustrated embodiment, the VCM 112 includes a processor 330, input/output hardware 332, a data storage component 336 (which stores path data 338*a*, mapping data 338*b*, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, the non-transitory computer-readable medium may reside within the VCM 112 and/or external to the VCM 112.

Additionally, the memory component 140 may store operating logic 342, traction logic 344*a*, steering logic 344*b*, hoist logic 344*c*, and accessory logic 344*d*. The operating logic 342 may include an operating system and/or other software for managing components of the VCM 112. The traction logic 344*a* may be configured with one or more algorithms and parameters for facilitating and optimal traction and maintaining traction via a traction control module (TCM) for the vehicle 106. The steering logic 344*b* may be configured with one or more algorithms and parameters for facilitating optimal steering control of the vehicle 106 via a steering control module (SCM). The hoist logic 344*c* may include one or more algorithms and parameters for facilitating optimal hoist control of the vehicle 106. The accessory logic 344*d* may include one or more algorithms and parameters for facilitating operation of the accessories of the vehicle 106, such as via a hydraulic module. A local communication interface 346 is also included in FIG. 3 and may be implemented as a bus or other communication interface to facilitate communication among the components of the VCM 112.

The processor 330 may include any processing component operable to receive and execute instructions (such as from the data storage component 336 and/or the memory component 140). The input/output hardware 332 may include and/or be configured to interface with a monitor, positioning system, keyboard, touch screen, mouse, printer, image capture device, microphone, speaker, gyroscope, compass, and/or other device for receiving, sending, and/or presenting data. The network interface hardware 334 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the VCM 112 and other computing devices.

It should be understood that the components illustrated in FIG. 3 are merely exemplary and are not intended to limit the scope of this disclosure. While the components in FIG. 3 are illustrated as residing within the VCM 112, this is merely an example. In some embodiments, one or more of the components may reside external to the VCM 112. It should also be understood that while the VCM 112 in FIG. 3 is illustrated as a single device, this is also merely an example. In some embodiments, the traction logic 344a, steering logic 344b, hoist logic 344c, and/or accessory logic 344d may reside on different devices. Additionally, while the VCM 112 is illustrated with the traction logic 344a, steering logic 344b, hoist logic 344c, and accessory logic 344d as separate logical components, this is also an example. In some embodiments, a single piece of logic may cause the VCM 112 to provide the described functionality.

It should be understood that the VCM 112 may communicate with the NCM 114 to coordinate the various conditions of manual operation and automatic operation of the vehicle 106. As such, Table 1 below represents an example of data that may be sent from the VCM 112 to the NCM 114, depending on the type of VCM being utilized.

TABLE 1

| VCM to NCM messages | |
| --- | --- |
| Producer | VCM |
| CAN ID | A/B |
| Purpose | System Info & Status |
| Length | 8 |
| Consumers | NCM |
| Report Rate | Every 16 mS |

| Byte | Contents | Description | Units/Scaling |
| --- | --- | --- | --- |
| Byte 0 | Vehicle System ID Data (LSB) | | |
| Byte 1 | Vehicle System ID Data (MSB) | | |
| Byte 2 | Vehicle State | Enumeration | 1 = Initialization, |
| | | | 2 = Standby, |
| | | | 3 = Manual |
| | | | 4 = Auto |
| | | | 5 = reserved |
| | | | 6 = reserved |
| | | | 7 = Error |
| Byte 3 | Vehicle Status Word (LSB) | Bit 0—MSS Switch State | 0—Man, 1—Auto |
| | | Bit 1—BRS2 Switch State | 0—Off, 1—On |
| | | Bit 2—ED1 Contactor State | 0—Open, 1—Closed |
| | | Bit 3—MAN Contactor State | 0—Open, 1—Closed |
| | | Bit 4—Error Bit 1 | Enumerated |
| | | Bit 5—Error Bit 2 | Error codes 0-15 |
| | | Bit 6—Error Bit 3 | |
| | | Bit 7—Error Bit 4 | |
| Byte 4 | Vehicle Status Word (MSB) | Bit 8—Traction Mode Bit 1 | Enumeration |
| | | Bit 9—Traction Mode Bit 2 | 0-3** |
| | | Bit 10—Steer Mode Bit 1 | Enumeration |
| | | Bit 11—Steer Mode Bit 2 | 0-3** |
| | | Bit 12—Hoist Mode Bit 1 | -Enumeration |
| | | Bit 13—Hoist Mode Bit 2 | 0-3** |
| | | Bit 14—Accessory Mode Bit 1 | Enumeration |
| | | Bit 15—Accessory Mode Bit 2 | 0-3** |
| Byte 5 | Freshness Counter | 0-255 Counts | Increase 1 each tx |
| Byte 6 | Load Weight (LSB) | 0 to 65535 | LBS |
| Byte 7 | Load Weight (MSB) | | |

As illustrated in Table 1, the VCM 112 may communicate vehicle data directly with NCM 114 via the navigation control interface 116 (FIG. 1). Accordingly, the VCM 112 may include a data packet or stream that includes a plurality of bytes of data (e.g., 4, 8, 16, 32 bytes, etc.). In the example of Table 1, the data is structured as an 8 byte communication, where the byte 0 and byte 1 provide a vehicle identifier. Byte 2 may be utilized for providing a vehicle state. As an example, initialization may be identified as a first vehicle state, with standby, manual, auto as additional vehicle states. If there is error in the vehicle state, a byte configuration may be allocated for such an occurrence.

Similarly, bytes 3 and 4 may be utilized for a vehicle status. As an example, bit 0 may be utilized for a state of the MSS 302 (manual/auto). Bit 1 may be utilized to identify a brake switch state of BRS1 (on/off). Bit 2 may be utilized to identify the ED1 contactor state (open/closed). Bit 3 may be utilized to identify a state of the manual contactor 305. Bits 4-7 may be utilized for up to 15 different error codes. Similarly, byte 4 is utilized for identifying a functional mode type, such as a traction mode, steering mode, hoist mode, and accessory mode. Byte 5 may be used as a freshness counter, while bytes 6 and 7 may be utilized to identify the load weight on the fork.

Similarly Table 2 represents data that may be sent from the NCM 114 to the VCM 112, depending on the particular type of NCM 114.

TABLE 3 application versus mode

| | Control Mode | | | |
|---|---|---|---|---|
| Functional Mode | Speed Control with default PI Gain Mode | Speed Control with adjustable PI Gain Mode | Torque Control Mode | Position Control Mode |
| Traction | 00 | 01 | 10 | 11 |
| Steer | 00 | 01 | 10 | 11 |
| Hoist | 00 | 01 | 10 | 11 |
| Accessory | 00 | 01 | 10 | 11 |

As illustrated in Tables 1 and 2, the VCM 112 may send the NCM 114 messages regarding the particular functional mode that may be used in Byte 4. Specifically, bits 8 and 9 are reserved for traction mode (using traction logic 344*a*); bits 10 and 11 are reserved for steer mode (using steering logic 344*b*); bits 12 and 13 are hoist mode (using hoist logic 344*c*), and bits 14 and 15 are reserved for accessory mode (using accessory logic 344*d*). As illustrated in Table 3, when the vehicle 106 is in traction mode, steer mode, hoist mode, or accessory mode, a selection may be made regarding the control mode to be utilized. As an example, speed control with default PI gains may be utilized when the vehicle 106 is being automatically controlled by the NCM 114. While the NCM 114 is controlling operation of the vehicle 106, the speed control with default PI gains may be utilized with a speed parameter to control the responsiveness of the vehicle

TABLE 2

| NCM to VCM messages | |
|---|---|
| Producer | NCM |
| CAN ID | A/B |
| Purpose | System Info & Status |
| Length | 8 |
| Consumers | VCM |
| Report Rate | Every 16 mS |

| Byte | Contents | Description | Units/Scaling |
|---|---|---|---|
| Byte 0 | AGV System ID Data (LSB) | | |
| Byte 1 | AGV System ID Data (MSB) | | |
| Byte 2 | NS State | Enumeration | 1 = Initialization, 2 = Standby, 3 = Manual, 4 = Auto, 5 = reserved, 6 = reserved, 7 = Error |
| Byte 3 | NS Status Word (LSB) | Bit 0—MSS State<br>Bit 1—BRS1 Switch State<br>Bit 2—AUTO Contactor State<br>Bit 3—reserved<br>Bit 4—Error Bit 1<br>Bit 5—Error Bit 2<br>Bit 6—Error Bit 3<br>Bit 7—Error Bit 4 | 0—Man, 1—Auto<br>0—Off, 1—On<br>0—Open, 1—Closed<br>reserved<br>Enumerated<br>Error codes 0-15 |
| Byte 4 | NS Status Word (MSB) | Bit 8—Traction Mode Bit 1<br>Bit 9—Traction Mode Bit 2<br>Bit 10—Steer Mode Bit 1<br>Bit 11—Steer Mode Bit 2<br>Bit 12—Hoist Mode Bit 1<br>Bit 13—Hoist Mode Bit 2<br>Bit 14—Accessory Mode Bit 1<br>Bit 15—Accessory Mode Bit 2 | Enumeration<br>0-3<br>Enumeration<br>0-3<br>Enumeration<br>0-3<br>Enumeration<br>0-3 |
| Byte 5 | Freshness Counter | 0-255 Counts | Increase 1 each tx |
| Byte 6 | Braking Status Word | | 1—No braking<br>2—Plug brake<br>3—Service brake |
| Byte 7 | | reserved | |

106. As such, a system administrator (or other third party) may choose to use the PI values which were used to tune the vehicle 106 for manual operation. The speed control with adjustable PI gains is similar, except that the PI gains are available to be dynamically adjusted by the system user or system administrator, depending on the particular action that the vehicle 106 is performing. As an example, the vehicle 106 may determine a weight of the current load on the vehicle 106. If the vehicle 106 is carrying a load that meets a predetermined weight threshold, the vehicle 106 may send a signal to the navigation system 102 (and/or NCM 114). The navigation system 102 (and/or NCM 114) may then alter the PI gains to provide a tighter response to commands.

Additionally included is the torque control mode. More specifically, while the other control modes are configured for sending a speed control to a controller, such as proportional-integral-derivative (PID) controller, a proportional-integral (PI) controller, a fuzzy controller, an H-infinity controller, and/or other similar controllers, which sends a control command and/or a power signal to a motor (as with the speed controls described above), the torque control mode utilizes the TCM, which may be configured as a power module to utilize a torque command and provide a power signal directly to the motor without utilization of the controller residing in the VCM 112. Thus, the torque control mode may provide the system user with more overall control of the vehicle 106 in automatic mode. However, this may require a greater level of competency on the part of the AGV system integrator to configure the vehicle 106. The position control mode may utilize a position parameter and provide position commands to the VCM 112, which shifts the burden from the NCM 114 to the VCM 112 to accurately control the position of the vehicle 106

As also illustrated in Table 3, each of the functional modes (traction, steering, hoist, and accessory) may be utilized for any of a plurality of different control modes (speed control with default PI values, speed control with adjustable PI values, torque control, and position control). Specifically, if the vehicle 106 is operating in traction mode, the traction logic 344a may be utilized for providing traction control of the vehicle 106. If the vehicle 106 is operating in steer mode, the steering logic 344b may be utilized for providing control parameters for steering of the vehicle 106. In hoist mode, the hoist logic 344c may be utilized to provide control parameters with regard to hoisting the fork of the vehicle 106. In accessory mode, the accessory logic 344d may be utilized for controlling one or more accessories of the vehicle 106. Each of these control modes may be used with any of the functional modes depicted in Table 3.

Figure 4:
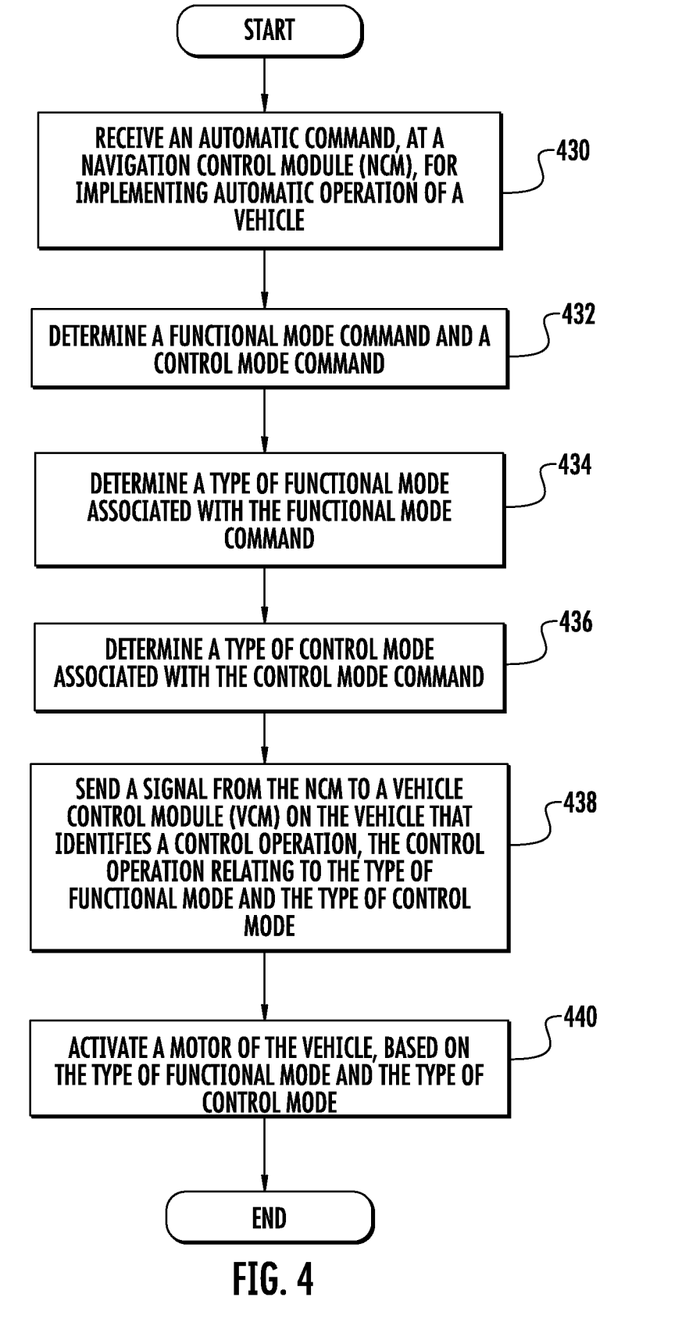
FIG. 4 depicts a flowchart for implementing one or more functional modes for a vehicle, according to embodiments shown and described herein.

FIG. 4 depicts a flowchart for implementing one or more functional modes for a vehicle 106, according to embodiments shown and described herein. As illustrated in block 430, an automatic command may be received at the NCM 114 for implementing automatic operation of the vehicle 106. In block 432, a functional mode command and a control mode command may be received. In block 434, a type of functional mode may be determined from the functional mode command. In block 436, a type of control mode may be determined from the control mode command. In block 438, a signal may be sent from the NCM 114 to the VCM 112 on the vehicle 106 that identifies a control operation. The control operation may relate to the type of functional mode and the type of control mode. In block 440, a motor of the vehicle 106 may be activated, based on the type of functional mode and the type of control mode.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising a vehicle comprising a memory component, a vehicle control module (VCM), the VCM comprising a VCM controller, and a navigation control module (NCM), wherein:
    the vehicle comprises operation modes including a manual operation mode for operator initiated control of the vehicle and an automatic operation mode for system initiated operation of the vehicle;
    the memory component stores logic for implementing one of a plurality of preselected functional modes of operation with one of a plurality of preselected control modes of operation, wherein each of the functional modes of operation provides enhanced vehicle control for the respective portion of the vehicle associated with the selected functional mode when the respective portion of the vehicle being utilized relative to when that functional mode of operation is not engaged when the respective portion of the vehicle is being utilized, and wherein one of the control modes is implemented with any one of the functional modes, based on a user input and a selected operation mode;
    the VCM communicates a selected control mode of operation and a selected functional mode of operation that is currently being implemented by the vehicle to the NCM in a single communication;
    when operating in manual operation mode, the VCM receives control commands from a system operator and implements the control commands, utilizing the VCM controller;
    at least one of the control modes of operation is configured for automatic control operating with the automatic operation mode of the vehicle; and
    at least one of the control modes of operation is a torque control mode for providing a power signal directly to a vehicle motor, without utilization of the VCM controller.

2. The system of claim 1, wherein the functional modes of operation comprise at least one of the following: a traction mode for providing additional vehicle control capabilities over traction of the vehicle, a steer mode for providing additional vehicle control capabilities over steering of the vehicle, a hoist mode for providing additional vehicle control capabilities over raising and lowering of a hoist of the vehicle, and an accessory mode for providing additional vehicle control capabilities over an accessory of the vehicle.

3. The system of claim 1, wherein the desired function of the vehicle comprises at least one of the following: maintaining traction, steering, hoisting, and maintaining an accessory of the vehicle.

4. The system of claim 1, wherein the control modes of operation comprise a speed control mode with default PI gains that operates in automatic operation mode and utilizes default proportional integral (PI) gains to control speed responsiveness of the vehicle, the speed control mode with adjustable PI gains, that utilizes dynamic PI gains, based on a condition of the vehicle and controls the speed responsiveness of the vehicle, based on the condition, and a position control mode that alters control of the vehicle, based on a location of the vehicle.

5. The system of claim 4, wherein in response to implementation of at least one of the control modes of operation, the VCM sends a control command, via the VCM controller, for operation of the vehicle.

6. The system of claim 5, wherein:
the VCM sends the control command, via the VCM controller, to a power module,
the power module comprises at least one of the following: a traction control module, a steering control module, and a hydraulic module, and
the power module sends the power signal to a motor of the vehicle.

7. The system of claim 1, wherein the mechanism for controlling the vehicle comprises at least one of the following: controlling the vehicle via a speed parameter, controlling the vehicle via a position parameter, and controlling the vehicle via the power signal.

8. The system of claim 1, wherein the vehicle comprises an NCM, wherein the NCM communicates a selected control mode and a selected functional mode to the VCM for vehicle implementation.

9. The system of claim 1, wherein the vehicle comprises an NCM and wherein a speed control with default PI gain mode is utilized when the vehicle is being controlled by the NCM, such that a system administrator selects PI values for controlling the responsiveness of the vehicle.

10. The system of claim 1, wherein a speed control with adjustable PI gain mode is utilized to adjust PI gains, depending on a particular action that the vehicle is performing.

11. The system of claim 10, wherein the vehicle comprises an NCM and wherein the PI gains are adjusted by the NCM.

12. The system of claim 1, wherein the vehicle comprises an NCM, the control modes of operation comprise a position control mode, and selection of the position control mode shifts control of a position of the vehicle from the NCM to the VCM.

13. The system of claim 1, further comprising: a navigation system and a remote computing device, wherein:
the vehicle comprises an NCM;
the navigation system communicates with the NCM to provide automatic control commands to the vehicle; and
the remote computing device processes a work order, determines whether the vehicle will fulfill the work order, and communicates with the navigation system to provide the automatic control commands.

14. The system of claim 1, wherein the VCM controller comprises at least one of the following: a proportional-integral-derivative (PID) controller, a proportional-integral (PI) controller, a fuzzy controller, and an H-infinity controller.

15. A method comprising:
receiving, by a computing device, an automatic command at a navigation control module (NCM) that is configured for implementing an automatic operation mode of a vehicle;
determining, by the computing device, a functional mode command related to a functional mode of operation and a control mode command related to a control mode of operation, wherein each of the functional modes of operation provides enhanced vehicle control for a different portion of the vehicle while that portion of the vehicle is being utilized compared to vehicle control when the respective functional mode of operation is not implemented while that portion of the vehicle is being utilized, wherein at least one of the control modes is configured to be used only in the automatic operation of the vehicle, and wherein one of the control modes is implemented with any one of the functional modes, based on a user input and a selected operation mode;
determining, by the computing device, a type of functional mode associated with the functional mode command;
determining, by the computing device, a type of control mode associated with the control mode command, wherein one of the control modes is implemented with any one of the functional modes, based on a user input;
sending, by the computing device, a signal from the NCM to a vehicle control module (VCM) on the vehicle that identifies a control operation, wherein the control operation identifies the type of functional mode and the type of control mode, wherein when operating in automatic operation mode, the VCM receives control commands with the type of control mode and the type of functional mode from the NCM and implements the control commands to operate the vehicle; and
activating, by the computing device, a motor of the vehicle, based on the type of functional mode and the type of control mode.

16. The method of claim 15, wherein determining the type of functional mode comprises determining whether the functional mode command identifies at least one of the following functional modes: a traction mode, a steer mode, a hoist mode, and an accessory mode.

17. The method of claim 15, wherein determining the type of control mode comprises determining whether the control mode command identifies at least one of the following control commands: a speed control mode with default PI gains, a speed control mode with adjustable PI gains, a torque control mode, and a position control mode.

18. The method of claim 15, further comprising utilizing a traction control module to activate the motor.

19. A vehicle comprising a memory component and a vehicle control module (VCM), which comprises comprising a VCM controller, wherein:
the vehicle comprises operation modes including a manual operation mode for operator initiated control of the vehicle and an automatic operation mode for system initiated operation of the vehicle, the vehicle further comprises control modes of operation and functional modes of operation, each of the functional modes of operation provides enhanced vehicle control for a respective portion of the vehicle associated with the selected functional mode while the respective portion of the vehicle is being utilized relative to vehicle control capabilities with the selected functional mode not engaged while the respective portion of the vehicle is being utilized, and one of the control modes is implemented with any one of the functional modes;
the memory component stores functional modes of operation and control modes of operation;
when operating in automatic operation mode, the VCM receives control commands with a selected control mode of operation and a corresponding functional mode of operation from the NCM and implements the control commands to operate the vehicle;
at least one of the control modes of operation is configured for operating with the automatic control operation mode of the vehicle, and one of the control modes is implemented with any one of the functional modes, based on a user input and a selected operation mode;

at least one of the control modes of operation is a torque control mode for providing a power signal directly to a vehicle motor, without utilization of the VCM controller; and at least one of the control modes of operation utilizes the VCM and the VCM controller for controlling the vehicle.

20. The vehicle of claim 19, wherein:

at least one of the functional modes of operation is implemented on the vehicle;

at least one of the control modes of operation is implemented on the vehicle; and the VCM communicates data identifying the at least one of the functional modes of operation and the at least one of the control modes of operation to a navigation control module (NCM).

* * * * *

UNITED STATES PATENT AND TRADEMARK OFFICE
CERTIFICATE OF CORRECTION

PATENT NO. : 9,778,656 B2
APPLICATION NO. : 13/626396
DATED : October 3, 2017
INVENTOR(S) : Lucas B. Waltz et al.

Page 1 of 1

It is certified that error appears in the above-identified patent and that said Letters Patent is hereby corrected as shown below:

In the Specification

Column 3, Line 57:
"As such, the vehicle 106 may receive one more locations (or"
Should read:
--As such, the vehicle 106 may receive one or more locations (or--.

Signed and Sealed this
Fourth Day of September, 2018

Andrei Iancu
*Director of the United States Patent and Trademark Office*